United States Patent [19]

Halabiya

[11] Patent Number: 4,549,564

[45] Date of Patent: Oct. 29, 1985

[54] PRESSURE MODULATOR VALVE

[75] Inventor: Sabah Halabiya, Rheinhausen, Fed. Rep. of Germany

[73] Assignee: Deere & Company, Moline, Ill.

[21] Appl. No.: 663,611

[22] Filed: Oct. 22, 1984

[30] Foreign Application Priority Data

Oct. 26, 1983 [EP] European Pat. Off. ........ 83110666.1

[51] Int. Cl.[4] .............................................. F15B 11/16
[52] U.S. Cl. ........................................ 137/110; 91/29; 91/31; 91/447
[58] Field of Search .......................... 137/110, 87, 115; 91/447, 29, 31

[56] References Cited

U.S. PATENT DOCUMENTS 2,721,640 10/1955 DeFeo .
3,116,607 1/1964 Gratzmuller ...................... 91/31 X
3,848,620 11/1974 Fisher .
3,946,760 3/1976 Murakami .
4,046,892 12/1977 Brisko ................................ 137/110

FOREIGN PATENT DOCUMENTS 1086740 2/1955 France .
1315721 5/1973 United Kingdom .

Primary Examiner—Alan Cohan

[57] ABSTRACT

A modulation valve for controlling flow to a fluid consuming device which valve provides a gradual buildup of fluid pressure and during at least part of the buildup restricts flow to the consuming unit. The valve includes a slide movable by a spring on one end and fluid pressure on the other. The slide has a blind bore on the pressure end which is adapted to move over a projection having a restricted passage therethrough. In at least one position of the slide, fluid flow to the consuming unit is through the projection and through a passage in the slide to the consuming unit. In another position of the slide, fluid flow is through the blind bore and through the passage in the slide to the consuming unit.

9 Claims, 4 Drawing Figures

PRESSURE MODULATOR VALVE

BACKGROUND OF THE INVENTION

The present invention relates generally to the art of hydraulic control devices and more specifically relates to a pressure modulation valve for automatically controlling pressure buildup in a fluid pressure consuming unit.

When actuating many hydraulic devices it is desirable to gradually bring the device up to full pressure rather than actuating the device with a pressure surge. An example of such a device would be a hydraulically applied clutch wherein it is desirable to gradually engage the clutch to avoid shock loads on the driven parts. With other hydraulic devices it is desirable to initially provide a large volume of flow to initially fill the device and then gradually bring the device up to full pressure. In the past many proposals have been made to provide modulating valves which permit the pressurization of hydraulic devices with the desired pressure-flow characteristics. All such devices have at least one characteristic in common, that is, they have a movable valve member or slide which is responsive to an increase in fluid pressure to gradually open or close a fluid passage.

Some prior valves initially provided full fluid flow to the devices and, when a certain pressure was reached, exhausted a portion of the fluid provided to the valve to reservoir and gradually cut off the flow to the reservoir as pressure built up. Such devices were not only complicated, but were subject to fluttering of the movable valve member. Other prior art valves required an extra movable member which functioned as an accumulator in order to provide the desired pressure buildup characteristics. These valves were again complicated and relatively expensive.

SUMMARY OF THE INVENTION

The general object of the present invention is to provide a valve for a fluid actuated device or consuming unit which, when subjected to fluid pressure, provides a gradual increase in pressure and which throttles or restricts the fluid flow to the device during at least a portion of the pressure buildup.

Another object of the present invention is to provide a valve for a fluid consuming unit which throttles the fluid flow to the consuming unit by limiting flow during a portion of the pressure buildup through a restricted orifice.

A further object according to a first embodiment of the invention is to provide a pressure modulation valve for controlling the flow and pressure of fluid delivered to a fluid consuming unit by initially limiting flow through a restricted aperture while gradually causing an increase in the pressure and, after a predetermined pressure is reached, permitting free flow of fluid under pressure to the consuming unit.

Yet another object according to the first embodiment of the invention is to provide a valve which restricts flow to a fluid consuming unit while modulating pressure buildup, but which permits free flow of fluid from the consuming unit when it is desired to exhaust fluid from the unit.

An additional object according to a second embodiment of the invention is to provide a pressure modulation valve for controlling the flow and pressure of fluid delivered to a fluid consuming unit by initially permitting substantially unimpeded flow to the consuming unit until the pressure reaches a predetermined point and then restricting flow to the consuming unit.

A still further object of the invention is to provide a pressure modulation valve which controls the flow of fluid to a pair of fluid consuming units in an alternating manner, which valve restricts the flow to one of the units while modulating pressure buildup and provides unimpeded flow to the other unit.

Still another object of the present invention is to provide a pressure modulation valve in which the fluid flow characteristics can be easily varied.

The above objects and other objects and advantages are obtained by a modulation valve which includes a single slide movable in a closed bore, the slide having a blind bore in one end thereof which is adapted to receive a cylindrical, shell-like projection extending from one closed end of the bore when biased to a first extreme position at the one end of the bore by a spring acting between the slide and the second closed end of the bore. Fluid pressure admitted through an opening adjacent the one closed end will act on the slide to force it against the spring force through an intermediate position to a second extreme position. A passage connects the blind bore to a first annular slot in the outer surface of the slide and the first annular slot communicates with an exit to the consuming unit when the slide is in an intermediate position and one of the extreme positions. A fluid passage extends through the projection from a point where the fluid pressure is admitted to the closed bore to the passage in the slide.

In the first embodiment of the invention the passage through the projection is always restricted and the slot communicates with the exit when the slide is in its intermediate and second extreme positions. When the slide is in its second extreme position the blind bore is completely removed from over the projection. In this embodiment, when fluid under pressure is admitted to the bore through the opening adjacent the one closed end, initial pressure buildup will move the side from the first extreme position to an intermediate position where communication is established between the slot and the exit to the fluid consuming unit. At this time restricted flow to the consuming unit is provided through the projection and slide to the consuming unit. This continues as the pressure builds up and the slide continues to move through the intermediate position. When the pressure reaches a predetermined point the slide reaches its second extreme position where the projection no longer extends into the blind bore and there is unrestricted flow to the consuming unit through the blind bore, the passage in the slide and the slot.

In the first embodiment the slide has a second annular slot which is in constant communication with an opening leading to a reservoir and when the slide is in its first position the exit leading to the consuming unit is in communication with the second slot.

In the second embodiment of the invention the annular slot in the slide is in constant communication with the exit in the consuming unit and the passage through the projection has two connections with the passage in the slide when the slide is in its first extreme position. One of the connections between the two passages is unrestricted and the other is restricted. In this embodiment there is initially unrestricted flow to the consuming unit while the slide is in its first position. As the slide moves to and through its intermediate position in response to pressure buildup, the passage in the slide moves out of communication with the unrestricted connection between the passages and the flow is throttled. When the slide reaches its second extreme position only the restricted connection provides communication between the two passages. The exhaust of fluid from the consuming unit in the second embodiment is just the opposite from the flow of fluid thereto.

In both embodiments of the invention the one end of the closed bore is closed by a removable plug which carries the projection. This permits replacement of the plug with one having a different size restriction through the projection so that the flow characteristics can be easily changed.

In both embodiments the valve can also control flow to and from a second consuming unit. This is accomplished by an additional fluid inlet opening to the bore and an additional exit to the second consuming unit. The slide is provided with an additional annular slot which communicates with both the additional opening and the additional exit when the slide is in it first extreme position and the second slot communicates with the additional exit when the slide is in its intermediate and third positions.

The details of construction of the modulation valve will, along with its function and how it achieves the above and other objects, become apparent to those skilled in the art from a reading of the following detailed description when read in conjunction with the accompanying drawings.

DESCRIPTION OF THE PREFERRED EMBODIMENT

Figure 1:
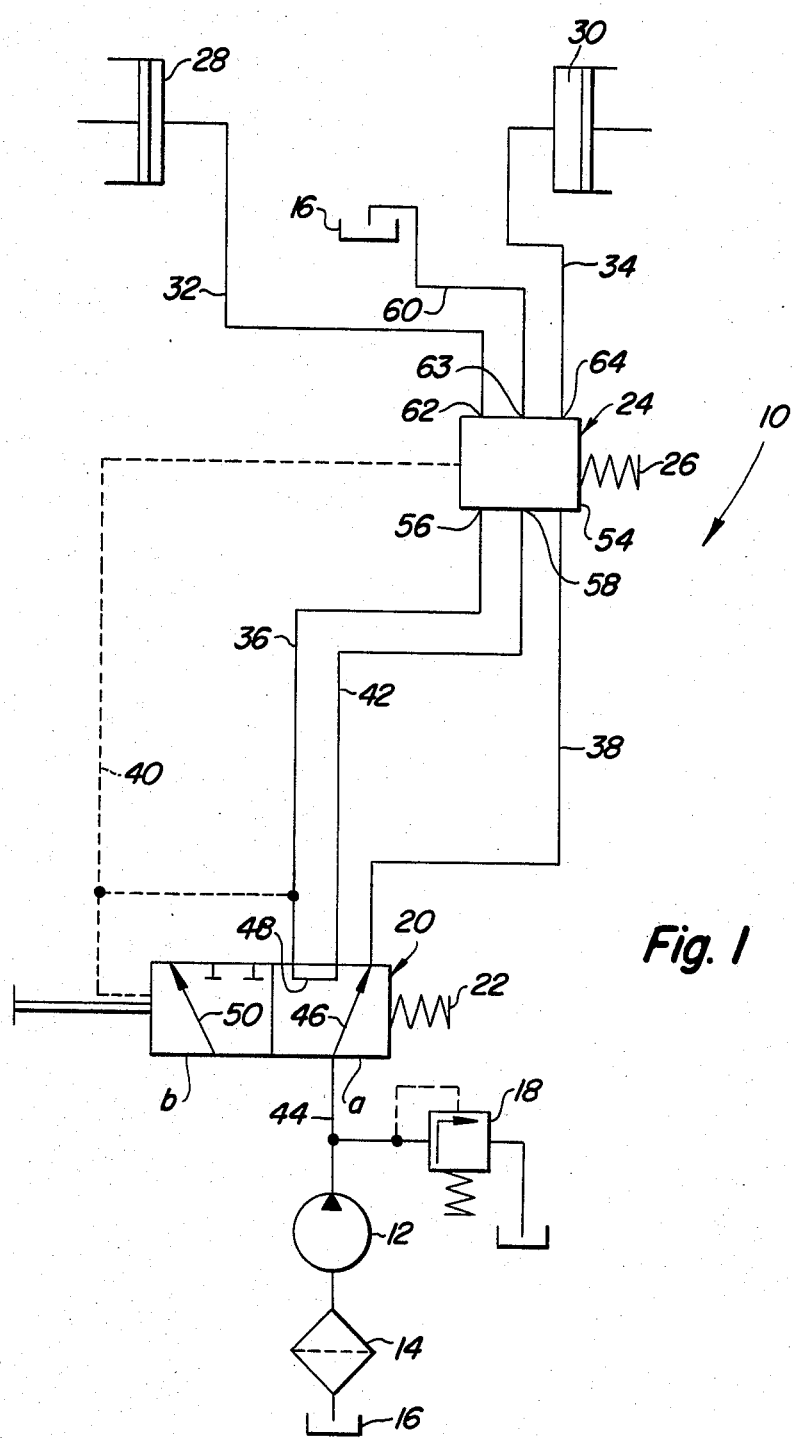
FIG. 1 is a schematic representation of a hydraulic circuit with a pressure modulating valve in accordance with the present invention.

Referring first to FIG. 1 wherein a complete hydraulic circuit 10 is schematically shown, a pump 12 draws fluid from a reservoir 16 through a filter 14 and delivers pressurized fluid to a main control valve 20 through a line 44. A pressure limiting valve 18 is connected to the line 44 between the pump 12 and main control valve 20. The valve 20 is a two-position valve which is biased towards a first position indicated by the letter "a" in FIG. 1 by a spring 22 and is movable against the force of the spring 22 to a second position indicated by the letter "b" in FIG. 1. The main control valve 20 is connected to a pressure modulation valve 24 by conduits 36, 38 and 42. The fluid lines 36, 38, 42 enter the pressure modulating valve 24 at entry openings 56, 54 and 58, respectively. The pressure modulating valve 26 is movable between two extreme positions and is biased towards one extreme by a spring 26 and toward the opposite extreme by a fluid pressure in a pilot line 40 which is pressurized from the fluid line 36. Pressure in pilot line 40 also acts on the main control valve 20 to hold the main control valve in its second position against the bias of the spring 22.

The pressure modulating valve 24 has exit openings 62, 63 and 64 which lead through conduits or fluid lines 32, 60 and 34, respectively, to a first consuming unit 28, the reservoir 16, and a second consuming unit 30, respectively. The consuming units 28 and 30 are illustrated as simple-acting hydraulic cylinders, but those skilled in the art will recognize that the comsuming units may be double acting or may be hydraulic motors or other equivalent consuming units. When the main control valve is in its first position as illustrated in FIG. 1, an internal passage 46 connects the conduit 44 coming from the pump 12 with the conduit 38 leading to the pressure modulating valve 24 and a bridge 48 internal of the main control valve interconnects the conduits 36 and 42. When the main control valve is in its second position, an internal passage 50 connects the conduit 44 coming from the pump 12 to the conduit 36 leading to the pressure modulation valve and the communication between the conduits 36 and 40 is interrupted. When the main control valve is moved to its second position, the fluid pressure in the conduit 36 also exists in the pilot line 40 and acts on the main control valve to hold it in its second position against the force of the spring 22. The main control valve 20 may be manually actuated, electrically actuated or hydraulically actuated.

As will become apparent later from a description of FIGS. 2 and 3, the pressure modulating valve 24 can be described as having three basic positions. In the first position, which is at one extreme of its travel, the entry 54 is connected with the exit 64, the entry 58 is connected with the exit 63, the exit 62 is connected with the exit 63, and the entry 56 is blocked from all other entries and exits. The pressure modulation valve is biased towards its first position by the spring 26. The pressure modulation valve 24 assumes its first position when the main control valve 20 is in its first position, shown in FIG. 1, since the pilot line 40 is connected with the reservoir 16 by way of the conduit 36, bridge 48 in the main control valve 20, conduit 42, the connection between entry 58 and exit 63 in the modulation valve, and conduit 60. When a main control valve 20 and pressure modulating valve 24 are both in their first position, fluid from the pump 12 is fed directly to the second consuming unit 30 by way of conduit 44, passage 46, conduit 38, the connection between entry 54 and exit 64, and conduit 34. At the same time, all fluid is exhausted from the first consuming unit 28 to the reservoir 16 by way of conduit 32, the connection between the exits 62 and 63, and the conduit 60.

If the main control valve 20 is moved to its second position, fluid from the pump 12 is directed through the internal passage 50 of the main control valve 20 to the fluid line 36. Fluid pressure in the line 36 also enters the pilot line 40 which acts on the main control valve 20 to hold the main control valve 20 in its second position against the force of the spring 22. Fluid in the pilot line 40 also acts on the pressure modulation valve 24 and starts moving the pressure modulation valve toward an opposite extreme in its range of movement. The opposite extreme will hereinafter be designated as a third position of the modulation valve 24. As the modulation valve 24 moves towards the third position, it first moves to an intermediate or second position in which the entry 54 is still connected with the exit 64, the exit 64 is connected with the exit 63, the entry 58 is still connected with the exit 63, and the entry 56 has a restricted connection with the exit 62 so that a throttling of the fluid pressure passing from fluid line 36 and between entry 56 and exit 62 occurs. In this second position of the modulation valve 24, the second consuming unit 30 is connected with the reservoir 16 by way of the fluid line 34, the connection between the exits 64 and 63 and the fluid line 60. At the same time, a restricted flow from the pump 12 to the second consuming unit 28 takes place through the main control valve, the fluid line 36, the restricted connection between the entry 56 and exit 62 and the fluid line 32.

A continued buildup of pressure in the pilot line 40 causes the pressure modulation valve 20 to move to its third position. In the third position of the pressure modulating valve 24 the connections between the entries and exits are the same as for the second position except that the connection between the entry 58 and exit 62 is no longer restricted and full system pressure and flow is available to the first consuming unit 28.

Figure 2:
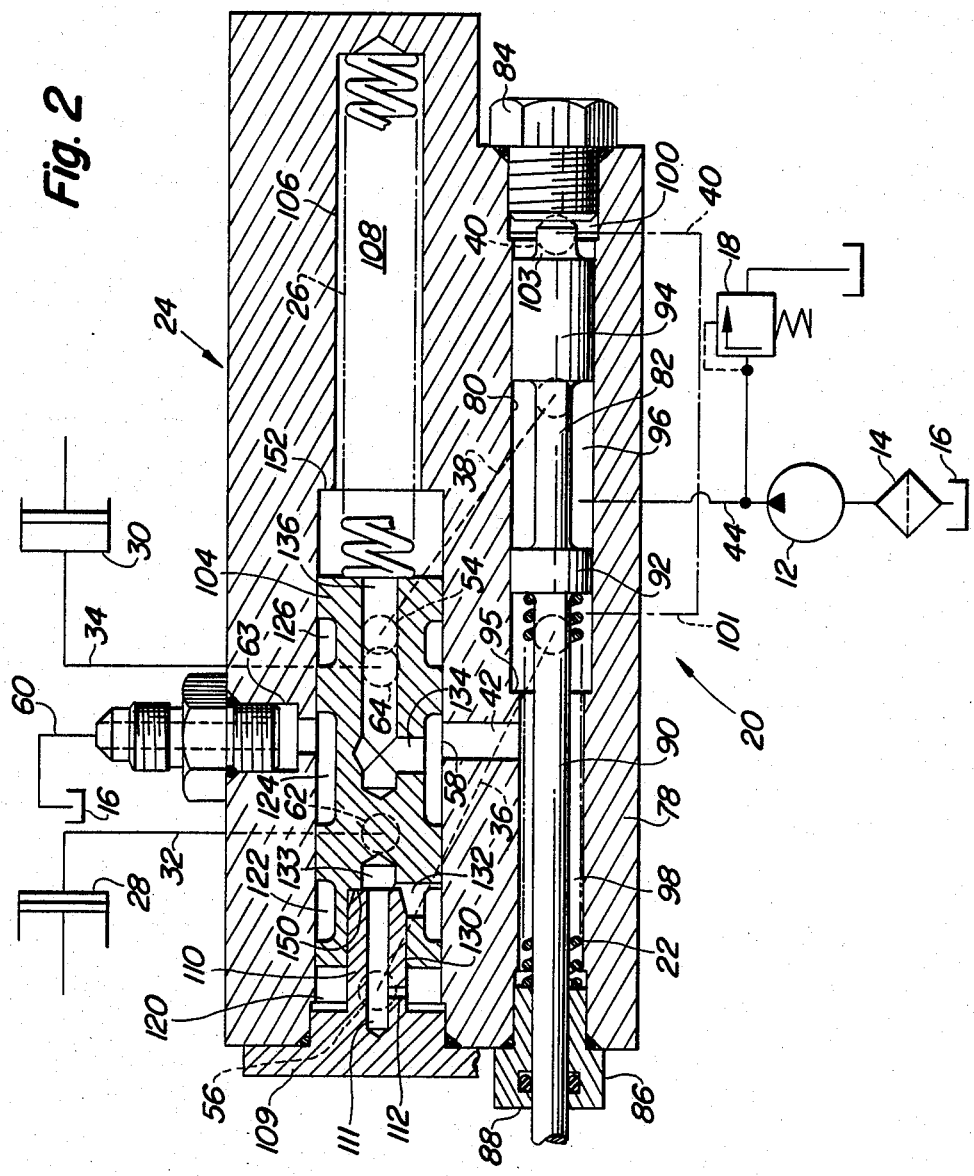
FIG. 2 is a longitudinal sectional view of a pressure modulating valve constructed in accordance with the main invention combined with a main control valve, other features of a complete hydraulic circuit being shown schematically.
Figure 3:
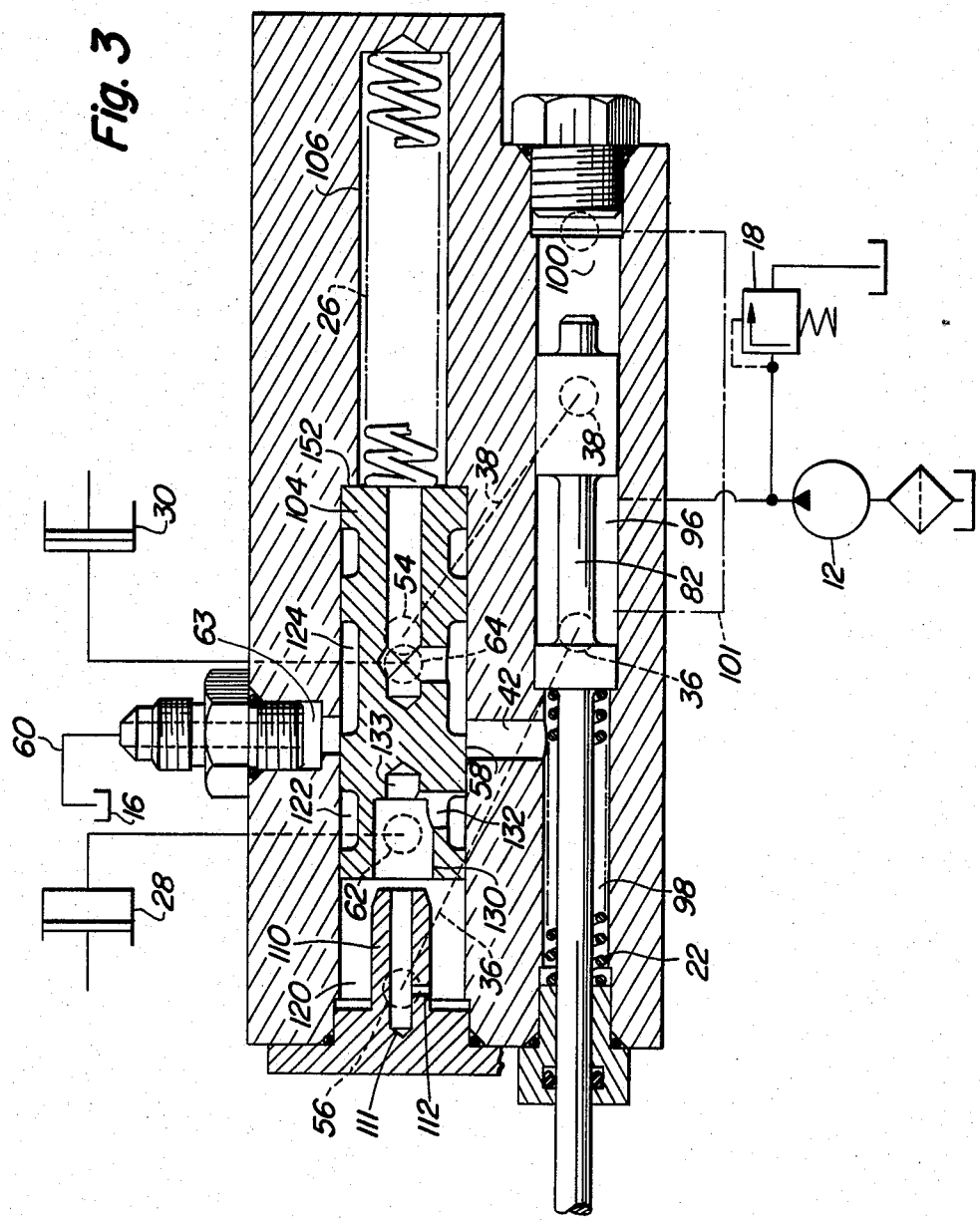
FIG. 3 is a view similar to FIG. 2 but showing the modulating valve and main control valve is a different operating state.

Referring now to FIGS. 2 and 3, the pressure modulating valve 24 and main control valve 20 are illustrated as being combined in a single housing. Both the main control valve and the modulation valve are shown in their first positions in FIG. 2. In FIG. 3 the main control valve is shown in its second position and the pressure modulation valve is shown in its third position.

The main control valve 20 includes a slide 82 slidably mounted in a stepped cylindrical bore 80 in substantially a fluid-type manner. The bore 80 is closed on its right end by a screw plug 84 and on its left end by a screwable lid 86. The lid 86 has a concentric bore 88 which accepts a thin shaft portion 90 of the slide 82. Shaft portion 90 extends through the bore 88 in a fluid-type manner to a position external of the housing 78 for suitable actuation purposes. Interiorly of the housing 78 and in the large diameter portion of the bore 80 the slide 82 is provided with spaced apart annular lands 92 and 94. The annular land 92 is relatively narrow as compared to the annular land 94 and is positioned on the slide 82 between the annular land 94 and a shoulder 95 formed by the juncture of the large and small diameter portions of the stepped bore 80. Movement of the slide 82 to the left as seen in FIG. 2 is limited by engagement between the annular land 92 and the shoulder 95 as shown in FIG. 3. Movement of the slide 82 to the right is limited by engagement between an end portion 103 of the slide 82 and the screw plug 84. The slide 82 is normally biased at positions shown in FIG. 2 by the spring 22 which encircles the shaft 90 and acts between the lid 86 and land 92. The conduit 44 from the pump 12 opens into the bore 80 between the lands 92 and 94, which are positioned apart a sufficient distance such that the conduit 44 is always located between the two. The space between the lands 92 and 94 will hereafter be designated pump chamber 96. As will become more apparent hereinafter, the pump chamber 96 functions as the passages 46 and 50 described with reference to FIG. 1, depending upon the position of the slide 82. The space between the land 92 and the lid 86 will hereinafter be designated as a variable volume spring chamber 98 and the space between the land 94 and the plug 86 will hereinafter be designated as a variable volume pilot chamber 100.

The conduit 36, which is shown as a broken line in FIGS. 2 and 3 for simplicity purposes, is formed in the housing 78 and opens into the bore 80 at a position which is located in the spring chamber 90 when the slide is in its first position, as illustrated in FIG. 2, and opens into the pump chamber 96 when the slide is in its second position, as illustrated in FIG. 3. The conduit 38, which is shown as a broken line in FIGS. 2 and 3 for simplicity purposes, is also formed in the housing 78 and opens into the bore 80 at a position located within the pump chamber 96 when the slide is in its first position and is covered by the land 94 when the slide is in its second position. Conduit 42 is also formed in the housing 78 and is always open to the spring chamber 98. One branch of the pilot circuit 40 opens into the bore 80 such that it is always in communication with the pilot chamber 100. Another portion 101 of the pilot circuit 40 opens into the bore 80 at a position which overlaps the opening of the conduit 36 into the bore so that it is in communication with the spring chamber in the first position of the slide 82 and is open to the pump chamber in the second position of the slide 82.

The pressure modulation valve 24 includes a slide 104 positioned in the large diameter portion of a stepped blind bore 106 which is closed by the housing 78 at an end 108 and by a special screwed plug 109 at its opposite end. The spring 26 is also located in the blind bore 106 between the closed end 108 and the slide 104 to normally urge this slide in the direction of the special plug 109 and its first position as shown in FIG. 2. The special plug 109 includes a cylindrical, shell-like projection which extends into the blind bore 106 and has a diameter substantially smaller than that of the blind bore 106. The projection 110 is provided with a blind bore 111 opened toward the bore 106 and a radial aperture 112 extends through the projection 110 to provide communication between the blind bore 111 and the external surface of the projection 110.

Conduit 36 opens into the blind bore 106 at entry 56 which is located adjacent the special plug 109. Fluid line 32 opens into bore 106 at entry 62 at a point spaced to the right from entry 56. Fluid line 60 opens into bore 106 at exit 63 which is spaced to the right of exit 62. Conduit 42 also opens into bore 106 at entry 58 which is radially displaced from but overlaps exit 63 in a direction axially of the bore 106. Fluid line 34 communicates with bore 106 at exit 64 which is spaced to the right of entry 58 and exit 63. Finally, conduit 38 enters bore 106 at entry 54 which as a slight overlap with exit 64.

The slide 104 has three annular slots designated as an aperture end slot 122, a middle slot 124, and a spring end slot 126. Slide 104 also has a blind bore 130 which is adapted to slidably receive the shell-like projection 110. The blind bore 130 is closed at a reduced diameter end portion 133. A radial bore 132 provides communication between the annular slot 122 and both the large and small diameter portions of the blind bore 130. Engagement between a shoulder formed by the large and small diameter portions of the blind bore 130 and an outer end 150 of the shell-like projection 110 limits movement of the slide 150 to the left as seen in FIG. 2 and determines the first position of the slide 104. Engagement by the spring side end of the slide 104 with a shoulder 152 formed by the juncture between the large and small diameter portions of the blind bore 106 limits movement of the slide 104 to the right and determines the third position of the slide 104 seen in FIG. 3. The spring side end of the slide 104 is provided with a blind bore 136 which is intersected by a radial bore 134 which communicates with the annular groove 124. The annular groove 124 is of such a width and positioned on the slide 104 such that it is constantly in communication with exit 63 and entry 58. Bores 134 and 136 prevent pressure buildup in the spring chamber formed by the small diameter portion of the stepped bore 106.

The space between the slide 104 and special plug 109 form a variable volume fluid chamber 120 whose minimum size is determined by engagement between the shoulder between the large and small diameter portions of the blind bore 130 and the end 150 of the shell-like projection 110. Both the entry 56 and the radial passage 112 are in constant communication with this chamber so that in this first position of the modulation valve, as shown in FIG. 1, there is communication between the annular slot 122 and entry 56 by way of radial passage 132, small diameter portion 133 of blind bore 130, blind bore 111 and radial bore 112 to annular space 120. In this first position of the slide 104, the exit 62 is separated from annular slot 122 but is in communication with middle annular slot 124. The spring end annular slot 126 is arranged in such a way that it is in communication with both the entry 54 and exit 64 when the slide 104 is in its first position.

From the foregoing description, it can be seen that the following modes of operation occur. With a non-operating pump, that is, pressureless hydraulic circuit 10, both the main control valve 20 and pressure modulating valve 24 will be found in the positions illustrated in FIG. 2 due to the actions of the springs 22 and 26, respectively. If the pump 12 is then operated, a flow of fluid under pressure takes place from the pump 12 via the conduit 44 into the pump chamber 96, and then via the conduit 38, entry 54, spring end annular slot 126, exit 64, and the conduit 34 to the second consuming unit 30. In this manner the second consuming unit 30 is acted upon by full system pressure, ignoring normal line losses. The first consuming unit 28 is pressureless at this time since it is connected via conduit 32, exit 62, middle annular slot 124, exit 63, and fluid line 60 to the reservoir 16. The pilot circuit 40 and pilot chamber 100 are also pressureless since they are connected via the line 101, spring chamber 98, conduit 42, entry 58, middle annular slot 124, exit 63, and fluid line 60 to the reservoir 16. the chamber 120 is also pressureless since it is connected via the entry 56 and fluid line 36 to the spring chamber 98. Since no pressure can build up in the pilot chamber 100 or the chamber 120, both the main control valve slide 82 and modulation valve slide 104 are maintained in the positions illustrated in FIG. 2 by the springs 22 and 26, respectively.

If the first consuming unit 20 is to be pressurized, the slide 82 of the main control valve 20 is displaced from its first position shown at FIG. 2 to its second position shown in FIG. 3 against the bias of the spring 22. In the second position, the pump chamber assumes a position in which the conduit 36 is open to it and also to the branch 101 of the pilot circuit 40. This fluid under pressure goes through the pilot circuit to the pilot chamber 100 so that the slide 82 is kept in its left position against the force of the spring 22. As long as the slide 82 is kept in its second position, fluid under pressure flows via the pump chamber 96 and the conduit 36 to the fluid chamber 120 where it acts against the aperture end of the slide 104 to urge the slide 104 against the force of the spring 26 in the direction of its third position shown in FIG. 3. During this displacement process and so long as the blind bore 130 still slides on the shell-like projection 110, fluid under pressure flows through the radial aperture 112, blind bore 111, and radial bore 132 to the aperture side annular slot 122. As soon as the aperture end annular slot opens partially to the exit 62, the first consuming unit is initially acted upon with a slight pressure which will gradually build up to maximum pressure. At approximately the same time the aperture side annular slot 122 starts to open to the exit 62, the middle annular slot 124 starts to open to the exit 64 to establish communication between the second consuming unit 30 and reservoir 16.

When the slide 104 reaches a position were there is a slight overlap between the annular slot 122 and exit 62, it is considered as being in its second position until it arrives at its third position in which the slide 104 abuts against the should 152 and has moved completely off of the shell-like projection 110 so that fluid no longer must flow through the aperture 112 but can flow directly from the chamber 120 to the blind bore 130 and radial bore 132. It should be understood that, as used herein, the expression second position does not mean one fixed position but is intended to mean all positions the slide can assume between its first and third positions. When the slide 104 is in its third position, the maximum pressure acting on the first consuming unit 28, as is also the case when fluid pressure is supplied to the second consuming unit 30, is determined by the adjustment of the pressure eliminating valve 18.

If the second consuming unit is to again be pressurized, the main control valve is moved from the position shown in FIG. 3 back to its first position shown in FIG. 2. During this movement, the fluid in the pilot chamber 100 is displaced back through the pilot line 40 to the pump chamber 96 and is relieved via the pressure limiting valve 18 until such time as the land 92 opens the line 101 to the spring chamber 98 so that the fluid can flow to the reservoir 16 via the conduit 42, middle groove 24 and conduit 60. It should be noted that while various conduits and fluid lines are illustrated by a single dashed or broken line for the purpose of simplicity, they will actually have some dimension to them and the dimension of the line 101 as it enters the bore 80 is preferably of a size substantially equal to the width of the land 92 so that the land 92 can pass thereover without a hydraulic lock being created in the pilot chamber 100. Also, with the form of main control valve shown, the hydraulic system is limited to a relatively low pressure system so that movement of the main valve from its second to its first position (forcing fluid from the pilot chamber 100 through the pressure limiting valve 18) does not require undue force. Of course, other means of exhausting fluid from chamber 100 could be provided.

The form of modulating valve illustrated in FIGS. 2 and 3 is designed for hydraulic circuits in which one consuming unit is to be gently acted upon and the second consuming unit is to be abruptly acted upon. This form of execution is very suitable for tractors with a power takeoff shaft for driving attached implements. In such tractors it is desirable that the power takeoff shaft may be gently engaged but abruptly braked. This form of execution can also have an application in some planetary transmissions which are controlled by hydraulic clutches and brakes.

Figure 4:
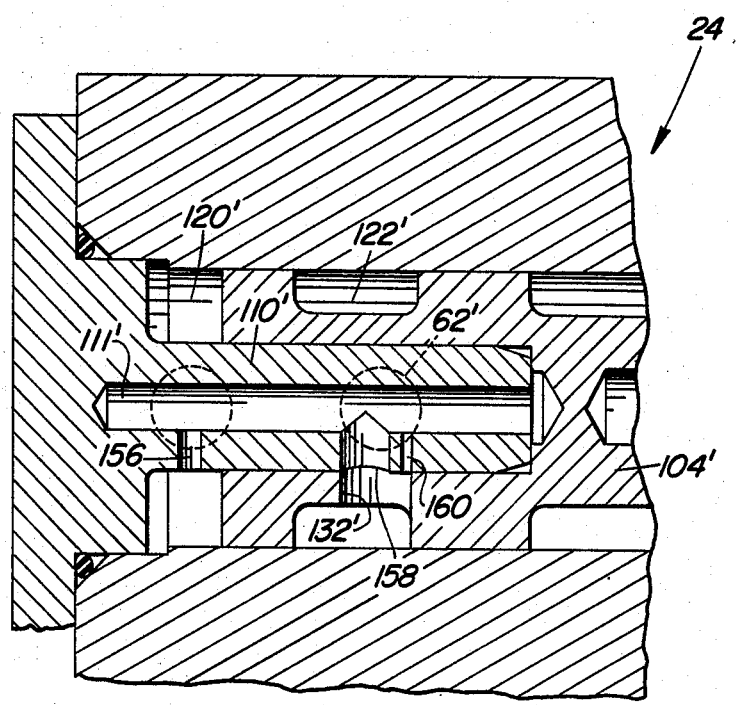
FIG. 4 is a sectional view of a portion of a modified pressure modulating valve in accordance with the present invention.

FIG. 4 shows a portion of a modified modulation valve which is the same in principle as that shown at FIGS. 2 and 3 but is designed in such a way that it produces a filling behavior for the first consuming unit different than the modulating valve shown in FIGS. 2 and 3. In FIG. 4, the shell-like projection 110' is provided with three radial bores or apertures 156, 158 and 160 which are all axially separated from one another and which all open into the pocket bore 111'. The first aperture 156 is positioned substantially the same as the aperture 112 in the first embodiment but has a diameter substantially larger than the aperture 112. The second and third apertures 158 and 160 are open to a bore 132' leading to the aperture side annular slot 122'. The second aperture 158 has a diameter at least as large as that of the aperture 156 and the third aperture 160 is restricted and thus has a diameter which corresponds approximtely to the diameter of the aperture 112 in the first embodiment. The exit 62' in this embodiment of the invention is arranged such that it is open to the aperture side annular slot 122' in all positions of the slide 104. In this case, when pressure is applied to the annular space 120', a large amount of fluid under pressure immediately flows through the aperture 156, blind bore 111' and the apertures 158, 160 into the aperture side annular slot 122' and through the exit 62' to the first consuming unit. At the same time the slide 104' will be displaced towards its third position to partially close the aperture 158. As the slide 104' continues to move to the right toward its third position, the aperture 158 is finally completely closed and the connection between the blind bore 111' and the aperture side annular slot 122' takes place only via the third aperture 160 which is of a reduced diameter. Thus, initially the consuming unit receives full fluid flow and upon further displacement of the slide 104 due to a pressure build-up, a throttling effect occurs. The exhaust of fluid from the first consuming unit occurs in an opposite direction, that is from the exit 62' through the bore 132', the apertures 158 and 160, blind bore 111', aperture 156, chamber 120', entry 56, conduit 36, spring chamber 98, conduit 42, middle annular slot 124, and fluid line 60 to the reservoir 16.

This modified form of the modulation valve is particularly suitable for hydraulic pistons with long strokes which require large amounts of fluid before building up to a maximum pressure.

Having thus described two preferred embodiments of the invention, various modifications within the scope of the invention will become apparent to those skilled in the art. Thus, the invention should not be limited to the specific embodiments disclosed, but only by the spirit and scope of the following claims.

I claim:

1. A pressure modulating valve comprising: a housing; a bore provided in said housing and having closed ends; an elongated circular projection extending axially into said bore from one closed end thereof and having a diameter less than the diameter of said bore; a valve slide axially slidable in said bore between first and third extreme positions while passing through a second position, said slide and the one closed end of the bore forming a variable volume fluid chamber; a blind bore provided in the end of said slide facing said projection, said blind bore having a diameter to slidably receive said projection; spring means in said bore acting between the second closed end thereof and the end of the slide to yeildably urge the slide to its first position in which the blind bore is fully positioned over said projection; a first passage opening into said bore adjacent the one end thereof and into the fluid chamber whereby when fluid pressure is directed through said first passage to said fluid chamber the pressure acting on the blind bore end of the slide will urge the slide against the force of the spring toward the third position which is displaced from the first position; a first annular slot provided in the outer surface of said slide; a consuming unit opening communicating with said housing bore in a position to be in communication with said slot when the slide is in at least two of its positions; a fluid passage formed in the slide providing communication between the blind bore and the first groove; and a restricted fluid passage in the projection providing restricted communiction between the fluid chamber and fluid passage in the slide in at least one of said at least two positions of the slide.

2. The valve as set forth in claim 1 characterized in that the depth of the blind bore is less than the length of the projection whereby engagement between the outer end of the projection and the inner end of the blind bore determines the minimum volume of said fluid chamber.

3. The valve asset forth in claim 1 characterized in that a second annular slot is provided in the outer surface of said slide in a position spaced from said first slot and having a width at least equal to the total travel of the slide between its first and third positions; an exhaust opening communicates with the housing bore in a position to be in communication with said second slot in all positions of said slide; and said consuming unit opening communicates with said bore in a position to be in communication with said second slot when the slide is in its first positon and with said first slot when the slide is in its second and third positions.

4. The valve as set forth in claim 3 characterized in that said slide is spaced from said projection when in its third position whereby fluid from said fluid chamber can flow directly into said blind bore and through the fluid passage in said slide to the first slot, and said slide is at least partially positioned over said projection when in the second position whereby fluid flowing from the fluid chamber to the first slot is throttled through the fluid passage in the projection.

5. The valve as set forth in claim 4 wherein said slide is provided with a third annular slot spaced from the second slot and on the side of the second slot opposite from the first slot; a second consuming unit opening communicates with the housing bore in a position to be in communication with the third slot when the slide is in its first position and with the second slot when the slide is in its second and third positions; and an additional passage opens into said housing bore in overlapping relationship with said second consuming unit opening in a positon to be in communication with said third slot when the slide is in its first position.

6. The valve as set forth in claim 4 wherein the one end of the housing bore is closed by a removable plug which carries said projection whereby, by changing plugs having different fluid passages through the projection, the flow characteristics through the valve may be modified.

7. The valve as set forth in claim 1 wherein said fluid passage through said projection includes an axial bore therein, a first aperture providing communication between the axial bore and fluid chamber, a second aperture providing communication between said axial bore and the fluid passage in the slide when the side is in its first position and restricted communication between said axial bore and the fluid passage in the slide when the slide is in its second position, and a third restricted passage providing communication between the axial bore and fluid passage in the slide when the slide in its third position whereby the third restricted passage throttles fluid flow from the fluid chamber to the first slot when the slide is in its third positon.

8. The valve as set forth in claim 7 wherein said slide is provided with second and third annular slots in its outer surface, said second and third annular slots being spaced from the first and from each other; a second consuming unit opening communicates with the housing bore in a position to be in communication with the third slot when the slide is in its first position and with the second slot when the slide is in its second and third positions; and an additional passage opens into said housing bore in a position to be in communication with said third slot when said slide is in its first position.

9. The valve as set forth in claim 7 wherein the one end of the housing bore is closed by a removable plug which carries said projection whereby, by changing plus having different flud passages through the projection, the flow characteristics through the valve may be modified.

* * * * *